United States Patent
Zhang et al.

(10) Patent No.: US 10,356,200 B2
(45) Date of Patent: Jul. 16, 2019

(54) OPTIMIZING USER INTERFACE DATA CACHING FOR FUTURE ACTIONS

(71) Applicant: Google LLC, Mountain View, CA (US)

(72) Inventors: Fan Zhang, Cupertino, CA (US); Peng Zhuang, Santa Clara, CA (US); Yi Meng, Fremont, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 15/392,894

(22) Filed: Dec. 28, 2016

(65) Prior Publication Data

US 2018/0183891 A1 Jun. 28, 2018

(51) Int. Cl.
*H04W 4/60* (2018.01)
*H04L 29/08* (2006.01)
(Continued)

(52) U.S. Cl.
CPC ........ *H04L 67/2847* (2013.01); *G06F 3/0484* (2013.01); *G06F 12/0813* (2013.01); *H04L 67/04* (2013.01); *H04L 67/125* (2013.01); *H04L 67/306* (2013.01); *H04W 4/60* (2018.02); *G06F 2212/154* (2013.01); *G06F 2212/60* (2013.01); *G06F 2212/62* (2013.01)

(58) Field of Classification Search
CPC ... H04L 67/04; H04L 67/125; H04L 67/2847; H04L 67/306; H04W 4/60; G06F 3/0484; G06F 12/0813; G06F 2212/154; G06F 2212/60; G06F 2212/62
See application file for complete search history.

(56) References Cited

U.S. PATENT DOCUMENTS 6,055,569 A    4/2000   O'Brien et al.
7,813,822 B1 * 10/2010  Hoffberg ............ G06K 9/00369
                                                    381/73.1
(Continued)

FOREIGN PATENT DOCUMENTS

EP           2221719           8/2010

OTHER PUBLICATIONS

Chang et al. "ProMWS: Proactive mobile Web service provision using context-awareness," IEEE International Conference on Pervasive Computing and Communications Workshops, Mar. 21, 2011, 6 pages.

(Continued)

*Primary Examiner* — Davoud A Zand
(74) *Attorney, Agent, or Firm* — Fish & Richardson P.C.

(57) ABSTRACT

The subject matter of this specification generally relates to pre-caching data for a predicted future action. In some implementations, a client device includes a data storage device having a cache that stores data received for one or more mobile applications and a data processing apparatus that communicates with the data storage device and a display. A user interface context can be determined for a given user interface being presented for a given application. A predicted next action that a user of the client device will perform at the given user interface can be determined based on the user interface context. Prior to detecting the predicted next action, a request for next action data that will be presented in response to the user performing the predicted next action can be transmitted over a network. The next action data can be received and stored in the cache.

18 Claims, 5 Drawing Sheets

(51) Int. Cl.
*G06F 3/0484* (2013.01)
*G06F 12/0813* (2016.01)

(56) References Cited

U.S. PATENT DOCUMENTS

| | | | |
|---|---|---|---|
| 2004/0177179 A1* | 9/2004 | Koivuniemi | G06F 3/0237 710/67 |
| 2005/0055426 A1 | 3/2005 | Smith et al. | |
| 2006/0200253 A1* | 9/2006 | Hoffberg | G05B 15/02 700/19 |
| 2008/0301300 A1 | 12/2008 | Toub | |
| 2010/0131443 A1 | 5/2010 | Agarwal et al. | |
| 2011/0029670 A1 | 2/2011 | Klein et al. | |
| 2013/0222329 A1 | 8/2013 | Larsby et al. | |
| 2014/0006335 A1 | 1/2014 | Hohndel et al. | |
| 2014/0258188 A1 | 9/2014 | Chen et al. | |
| 2015/0188981 A1* | 7/2015 | Liang | H04L 67/02 709/225 |
| 2015/0379429 A1* | 12/2015 | Lee | G06N 99/005 706/11 |
| 2015/0379430 A1* | 12/2015 | Dirac | G06N 99/005 706/12 |
| 2016/0094654 A1* | 3/2016 | Raman | H04L 67/1095 715/733 |
| 2016/0360336 A1* | 12/2016 | Gross | H04W 4/025 |

OTHER PUBLICATIONS

International Search Report and Written Opinion issued in International Application No. PCT/US2017/036294, dated Sep. 26, 2017, 15 pages.

\* cited by examiner

OPTIMIZING USER INTERFACE DATA CACHING FOR FUTURE ACTIONS

BACKGROUND

The Internet facilitates the exchange of data and transactions between users across the globe. This exchange of data enables data providers to provide various types of content to a variety of users. The data can be provided in various ways, including publishing the data on electronic documents (e.g., web pages) and within applications (e.g., mobile apps). The data is generally provided to a client device in response to a user request, e.g., in response to a user selecting a link to a web page. Each request may take time for the data provider to identify the appropriate data and transmit the data over the Internet to the client device.

SUMMARY

This specification describes systems, methods, devices, and other techniques for pre-caching data at a client device based on a next action that the user is determined, e.g., predicted, to perform.

In general, one innovative aspect of the subject matter described in this specification can be implemented in a client device that includes a display that presents user interfaces for one or more mobile applications. The client device can also include a data storage device having a cache that stores data received over a data communication network for the one or more mobile applications. The client device can also include a data processing apparatus that communicates with the data storage device and the display. The data processing apparatus can determine a user interface context for a given user interface being presented by the display for a given application. The user interface context for the given user interface can specify at least one of (i) a group to which data that is being presented in the given user interface belongs or (ii) a type of data that is being presented in the given user interface. The data processing apparatus can determine, based on the user interface context, a predicted next action that a user of the client device will perform at the given user interface. The data processing apparatus can transmit, over the data communication network and prior to detecting the predicted next action, a request for next action data that will be presented in response to the user performing the predicted next action. The data processing apparatus can receive, over the data communication network, the next action data and store the next action data in the cache. Other implementations of this aspect include corresponding apparatus, methods, systems, and computer programs, configured to perform the actions of the methods, encoded on computer storage devices.

These and other implementations can optionally include one or more of the following features. In some aspects, the data processing apparatus of the client device can detect an occurrence of the predicted action at the given user interface, obtaining the next action data from the cache, and update the user interface to present the next action data.

In some aspects, the user interface context specifies a rollup level of the data that is being presented in the given user interface. The rollup level can specify a hierarchical level at which the data is aggregated.

In some aspects, the predicted action next action is determined based on a number of times each action of a set of possible actions that can be performed at the given user interface has been performed by one or more users including the user when the given user interface had a context that matches the determined user interface context.

In some aspects, the data processing apparatus of the client device can detect a trigger event for determining the predicted next action. The predicted next action can be determined in response to detecting the trigger event.

In some aspects, the data processing apparatus of the client device can obtain a prediction model that determines the predicted next action based on the user interface context and convert the predictive model to mappings between predicted next actions and probabilities. Each mapping can be a mapping between a respective predicted next action and a probability of the respective predicted next action occurring for a given user interface context.

In some aspects, the data processing apparatus of the client device can select the predictive model from a set of predictive models based on at least one of (i) a prediction accuracy for each predictive model, (ii) a cache hit rate for each predictive model, (iii) a reduction in latency provided by each predictive model, or (iv) a number of historical user interactions performed by the user at the given user interface.

In some aspects, the data processing apparatus of the client device can determine that the next action data will be presented by a second application different from the given application. Prior to detecting the predicted next action, the data processing apparatus can obtain code for executing the second application and store the code in the cache.

Particular embodiments of the subject matter described in this specification can be implemented so as to realize one or more of the following advantages. The latency in obtaining and presenting data to a user can be reduced by pre-caching data that is likely to be requested in response to the user's next action, e.g., the user's next user interaction with an application. The latency in loading a web application can be reduced by identifying a web application that will be used to present data requested in response to the user's next action and obtaining the code, e.g., scripts, used to load the web application. Similarly, the latency in loading a mobile application can be reduced by identifying a mobile application that will be used to present data requested in response to the user's next action and loading the application in the background of the user's client device. Pre-caching data also allows the client device to present the data quicker as the client device does not have to wait for a request to traverse the network, the server to identify the requested data, and the requested data to make its way to the client device.

The techniques described in this document enable client side evaluation of user interaction with an application to predict an upcoming action that will be performed within the application (or another different application). That prediction enables the client device to request data required to support the upcoming action from a server before it is needed, such that when the data is needed, it will already be stored on the client device. As such, the techniques enable real-time transitions from a first user interface to a different user interface even though the transition to the different user interface may require an amount of data that otherwise would not be able to be downloaded fast enough to support the real-time transition. The evaluation of the data is also performed in the background of the client device (e.g., without interrupting use of the first user interface), such that the user experience with the first application is not degraded. Further, the techniques described in this document utilize real-time data (e.g., user interactions with the mobile device) that would not be available absent the use of computing devices.

The techniques described in this document also make effective and efficient use of a mobile device's limited cache to improve transitions between user interfaces that are updated (e.g., with new, filtered, or modified data) in response to user interaction. Using next action models described in this document improves the likelihood that the data stored in the cache will actually be requested. This reduced the likelihood that the mobile device will have to download data to support the user's interaction with the user interface at the time that the user requests the next user interface.

As there can be a significant amount of setup and teardown activity involved in performing mobile data downloads including obtaining access to the mobile device's processor, wi-fi or mobile network transceiver, and other components, receiving the data, and storing the data in a proper location, performing the data download in advance saves time and reduces the demand placed on the mobile device at a time that the mobile device is transitioning to a different user interface. The techniques described herein allow the mobile device to download future data at the same time as other data to reduce the number of times data is downloaded and therefore reduce the demand placed on the mobile device that would occur if the mobile device had to perform the setup and teardown activity multiple times.

Some native applications generate an initial user interface using data that is part of the application and therefore data that may be stored at the mobile device. However, a significant portion of the initial user interface and subsequent user interfaces is dynamically created based on data downloaded from a networked server. Thus, fluid use of the user interfaces requires efficient transfer of data to the mobile device. Due to hardware and network constraints, updating the user interface can be delayed if all (or a substantial portion) of the data is transferred when the user interface that the data is used for has not yet been requested.

Various features and advantages of the foregoing subject matter is described below with respect to the figures. Additional features and advantages are apparent from the subject matter described herein and the claims.

DETAILED DESCRIPTION

Figure 1:
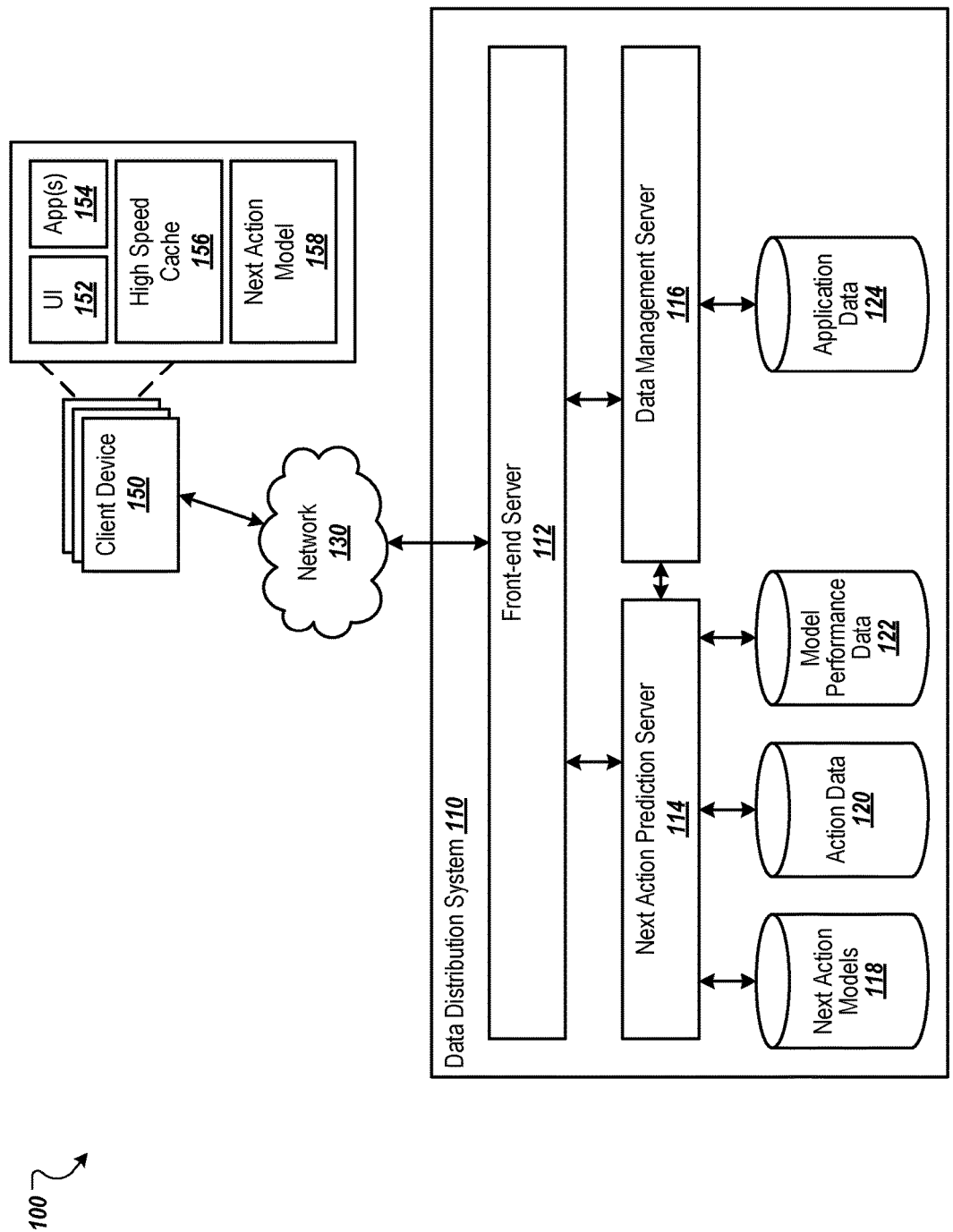
FIG. 1 is an example environment in which a data distribution system distributes data to client devices.

In general, systems and techniques described herein can reduce the latency in obtaining and presenting data by pre-caching the data prior to a user requesting the data. A system can determine one or more predicted next actions (e.g., future actions) that a user is likely to perform at a user interface of an application, e.g., at a mobile application that executes on a mobile device or at a web application that executes in a web browser. The system can identify data that will be presented in the user interface (or in another user interface that to which the application transitions to present the data) if the user actually performs the predicted next action and pre-cache the data at the user's client device prior to the user performing the action.

The system can determine the predicted next action based on the context of the user interface. For example, a user may be more likely to perform a particular action when a particular type of data is being presented in the user interface. The user interface context data used to determine the predicted next action can include, for example, the type of data that is being presented, a group to which the data belongs, a rollup level of the data, a tab of the application that is currently presented, a status of the user interface, and/or other appropriate context data.

The system can determine the predicted next action based on actions that the user viewing the user interface and/or other users performed in the past. For example, the system can maintain, for a set of actions (e.g., user interactions) that can be performed at a given user interface, a number of times the action has been performed by the user(s). The system can also maintain, for one or more user interface contexts, a number of times each action was performed when the user interface had a context that matches the user interface context. For example, one user interface context may be defined by the presentation of a particular group of data having a particular data type. For this user interface context, the system can maintain a count of the number of times each action was performed when the user interface was presenting the particular group of data having the particular data type. In some implementations, the system may select, as the predicted next action(s), one or more of the actions that have been performed the most in the past when the user interface was presenting the particular group of data having the particular data type.

In some implementations, the predicted next action may include presenting data using a different application from the application that is currently presenting the user interface. In this example, the system may pre-cache code for loading the different application at the client device to reduce the latency in loading the application if the predicted next action is actually performed. For example, the system may pre-cache scripts used to load another web application at a web page currently presented by the client device if the other web application will be used to present the data required by the predicted next action. This allows the client device to transition between web applications within the same web page (or within different web pages) fluidly and without unnecessary delay. The system can also pre-cache data that will be presented in the other web application to avoid delays and unnecessary demand placed on the client device to obtain the data.

In some implementations, the techniques described in this document can be used to pre-cache data for an application of a first device based on the context of a user interface of a second device different from the first device or more generally based on user interactions with the second device. For example, a user's interaction with an artificial intelligence (AI) assistant (e.g., questions asked to or requests provided to the artificial intelligence assistant) can be used to identify actions the user will likely perform at another device and to pre-cache data for the identified actions at the other device. In a particular example, a user may ask the AI assistant for running trails near a particular location. In response, a system can determine that the user is likely to access an activity monitoring application on a wearable device (e.g., smartwatch) or a smartphone and pre-cache data for the activity monitoring application at the wearable device or smartphone.

Cross-device action predictions can also be applied to other devices, such as smartcars (e.g., cars that have in-car computing capabilities), autonomous cars, smart televisions, smart appliances, and/or other appropriate smart devices. For example, the system may use data specifying that a user asked an AI assistant about a particular restaurant to pre-cache navigation instructions to the particular restaurant for an application of an in-car computing device, a navigation system of a car, or a navigation system of an autonomous car.

FIG. 1 is an example environment 100 in which a data distribution system 110 distributes data to client devices 150. The data distribution system 110 can transmit data to the client devices 150 over a data communication network 130, e.g., a local area network (LAN), a wide area network (WAN), the Internet, a mobile network, or a combination thereof. The client devices 150 may include smartphones, tablet computers, laptop computers, desktop computers, smartwatches, and/or other types of mobile and non-mobile computing devices.

A client device 150 can include one or more applications 154. For example, the client device can include one or more mobile applications (e.g., mobile apps). A mobile application can be a native application developed for a particular type of device or for a particular platform. The applications 154 can include web applications that execute in a web browser. Web applications may include code, e.g., scripts, that are downloaded to the client device 150 and executed in the web browser when a web page that includes the web application is opened in the web browser.

Figure 2:
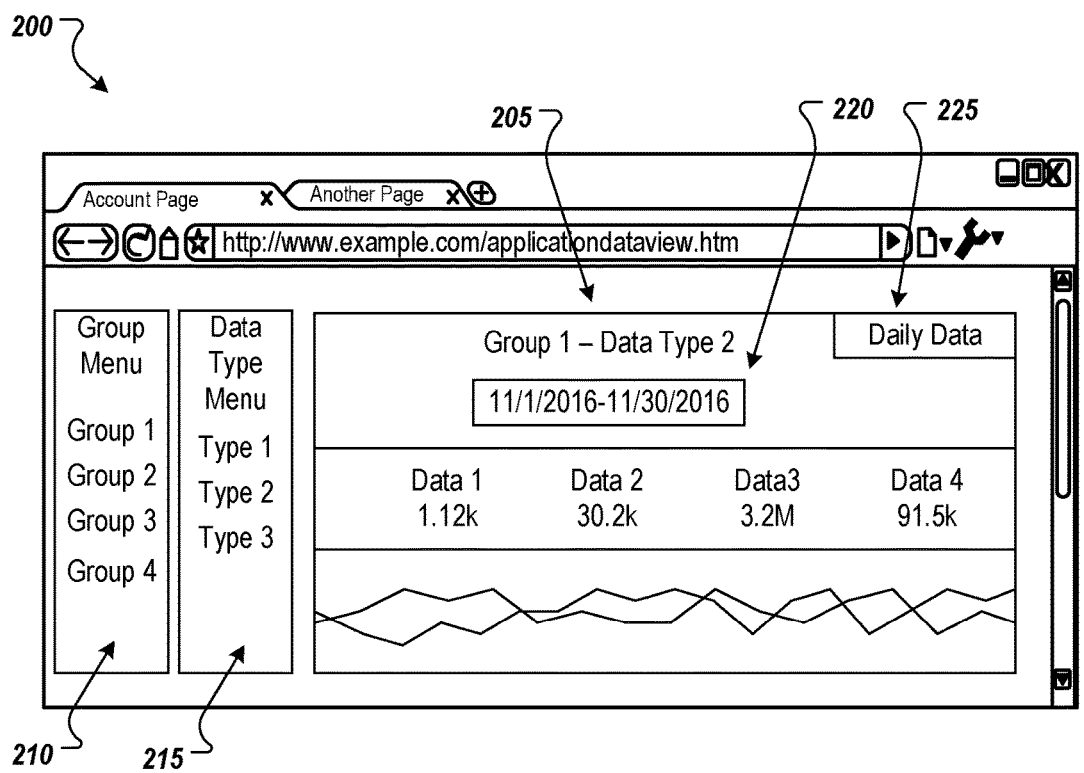
FIG. 2 depicts an example user interface in which data is presented.

Each application 154 can generate one or more user interfaces 152 that are presented by a display of the client device 150. A user interface 152 can present data and other content, such as images videos, graphs, etc. A user interface 152 can also include user interface elements that enable a user to navigate within the application (or outside the application), modify data, sort the data, filter the data, request additional or different data, and/or perform other appropriate actions. For example, a user interface 152 may include buttons, icons, slider bars, and other elements that allow a user to navigate between display screens, modify data, sort data, filter data, etc. A user interface 152 may include multiple tabs that present different data or different types of data. A user can navigate between the tabs by selecting the desired tab. In another example, a user interface may include a date and time range selector that allows a user to filter data to a particular date and time range. An example user interface is depicted in FIG. 2 and described below. For the purpose of this document, user interfaces are discussed generally. However, the techniques can be applied to other data regarding a client device, such as a state of the client device and/or previous interactions with the client device. Further, as used throughout this document, the term user interface is not limited to graphical user interfaces, but can include audible user interfaces as well as other user interfaces.

The applications 154 can present data received from the data distribution system 110 in the user interfaces 152. The data distribution system 110 can maintain data for one or more applications 154 and provide the data to the application(s) 154 in response to requests received from the client devices 150. For example, when the client device 150 loads an application 154, the application 154 can transmit a request to the data distribution system 110 over the network 130. The request can specify data that will be presented by the application 154. In addition, the user can use the user interface(s) 152 generated and presented by the application 154 to request additional or different data. In turn, the application 154 can request the data from the data distribution system 110.

The client device 150 also includes a high speed cache 156. The high speed cache 156 can include one or more high speed memory devices installed on the client device 150. For example, the high speed cache 156 can include static random-access memory (SRAM) and/or solid state memory devices. The client device 150 can also include other memory storage devices, such as hard drives, flash memory, etc.

The high speed cache 156 can store data for the applications 154, including data that has not yet been requested by a user of the client device 150. For example, the applications 154 (or another dedicated application) can determine one or more predicted next actions that the user is likely to perform. The predicted next action(s) may be actions that have at least a threshold probability of being performed by the user. The application 154 can also request, from the data distribution system 110, data that will be presented if the user performs the predicted next action. The application 154 can transmit this request prior to the user performing the predicted next action and without human intervention. For example, the application 154 can automatically determine the predicted next action in response to a trigger event (e.g., selection of a data and time range selector) and request the data in response to determining the predicted next action. When the application 154 receives the data, the application 154 can store the received data in the high speed cache 156 so that the data can be presented quickly if the user subsequently performs the predicted next action.

In some implementations, the data received for a predicted next action may be stored in a hard drive, flash memory, or some other memory storage device that is different from the high speed cache 156. Although using such memory may not be as fast as using a high speed cache 156, the latency in requesting the data over the network 130 after the user has performed the predicted next action is still eliminated or reduced.

An application 154 can use a next action model 158 to determine a predicted next action for a user. In some implementations, the next action model 158 is application-specific. For example, an application 154 may have a corresponding next action model 158 that determines a predicted next action for a user to which a user interface 152 of the application 154 is being presented. In another example, an application 154 may have a respective next action model 158 for each user interface 152 or for a set of user interfaces 152 generated and presented by the application 154. In this example, a next action model 154 may be used to determine a predicted next action for users to which the next action model's respective user interface(s) are presented.

In some implementations, an application 154 can have user-specific next action models 158. A user-specific next action model for an application 154 can be used to determine a predicted next action that a particular user is likely to perform at one or more user interfaces of an application 154. An application 154 may also have a general next action model that is used to determine a predicted next action for multiple users. As described in more detail below, the application 154 may select between a user-specific model and a general model for a particular user based on the number of actions the user has performed at user interfaces of the application 154.

A next action model 158 for an application 154 can specify, for each action in a set of actions that can be performed at a user interface 152 of the application 154, the probability that the action will be performed. For example, the next action model 158 may specify that a first action has a 50% probability of being performed at the user interface 152 while a second action has a 45% probability of being performed at the user interface 152. In this example, the application 154 may select one or more of the next actions having the highest probabilities as the predicted next action(s). As described in more detail below, the probabilities specified by a next action model 158 for an application 154 may be based on previous actions performed at user interfaces of the application 154.

The next action model(s) 158 for an application can be used to determine the predicted next action based on context of a user interface being presented to a user. The user interface context can be defined by a set of one or more attributes of the user interface. For example, the user interface context may be defined by attributes such as the type of data that is being presented (e.g., performance data, historical data, account data, content item distribution criteria), a group to which the data belongs (e.g., which account the data belongs), characteristics of the data (e.g., a size of an account to which the data belongs), a rollup level of the data, a tab of the application that is currently presented, a status of the user interface, and/or other appropriate attributes of the user interface or data being presented by the user interface. The rollup level of data can specify a hierarchical level at which the data is aggregated. For example, performance data can be obtained for each iteration of an event. This performance data can be aggregated for daily totals, weekly totals, monthly totals, etc. In this example, the monthly total would be at a higher rollup level than the weekly totals and the weekly totals would be at a higher rollup level than the daily totals.

In another example, statistics can be aggregated at multiple different hierarchical levels. For example, a football player's statistics can be aggregated at a game level, a season level, and a career level. In this example, the career level would be at a higher rollup level than the season level and the season level would be at a higher level than the game level.

The next action model(s) 158 for an application 154 can specify, for each user interface context (e.g., each set of one or more attributes of a user interface), the probability that each of a set of actions will be performed. When the application 154 uses the next action model(s) to determine a predicted next action, the application 154 can compare the attributes of the user interface currently being presented to the user to the attributes of the user interface contexts of the appropriate next action model 158 (e.g., the next action model for the user and/or user interface or a general next action model for multiple users and/or the user interface). The application 154 can evaluate the probabilities of actions specified by the next action model 154 and select one or more of the actions (e.g., the top N actions having the highest probabilities) as predicted next actions based on the probabilities. The application 154 can then request, from the data distribution system 110 data that will be presented by the application 154 (or another application) if the user performs the predicted next action(s). When the data is received from the data distribution system 110, the application 154 can store the data in the high speed cache 156.

If the attribute(s) of the current user interface does not match the attribute(s) of a user interface context for the next action model 158, the application 154 may select a user interface context that is most similar to the current user interface. For example, the application 154 may select a user interface context that has the highest number of matching attributes between the current user interface and the user interface contexts.

In some implementations, the next action model(s) 158 for an application 154 may include a predictive model that has been trained using machine learning techniques. For example, the next action model(s) 158 may be trained using features (e.g., attributes) of user interfaces and historical action data specifying actions performed by users when the user interfaces had particular contexts. The attributes of a user interface being presented to a user can be applied to the predictive model and the predictive model can output probabilities for each of a set of actions. The application 154 can then select the predicted next action(s) based on the probabilities.

In some implementations, a predictive model may be converted to mappings between predicted next actions and probabilities at the client device 150. Each mapping can be a mapping between a respective predicted next action and a probability of the respective predicted next action occurring for a given user interface context. In this way, the application 154 can more quickly look up the probabilities in the mapping than if the application 154 had to apply the attributes of the user interface to the predictive model.

In some implementations, a next action model 158 may determine a next action that, if performed by a user, would cause the client device 150 to load another application different from the application where the action is performed. For example, a user may be viewing a summary of account data in a first web application executing in a web browser. To view more detailed data that is presented using a second web application, the user may select a navigation button that causes the web browser to navigate to a different web page in which the second web application is executed. In another example, selection of a user interface may cause the web browser to load a different web application within the same web page.

If the next action determined using the next action model 158 would cause the client device 150 to load another application, the application 154 may request code for the other application or cause the client device 150 to load the other application in the background of the client device. For example, if the other application is a web application, the code for the web application can be obtained and stored in the high speed cache 156. If the other application is a mobile application, the mobile application can be loaded in the background of the client device 150. The application 154 can also request the data that will be presented if the predicted next action is performed. This data can also be stored in the high speed cache 156. By loading the application (or obtaining the code for loading the application) and obtaining the data prior to the user performing the predicted next action, the application can be loaded (or presented) and the data can be presented faster than if the client device 150 waited until the predicted next action is performed.

In some implementations, an application 154 can include a separate next action model 158 for each type of action that can be performed at a user interface 152. For example, the application 154 can include a next action model for place change actions that cause the application 154 to navigate to a new tab or page and another next action model for scope change actions that change the scope of data being presented at the user interface (e.g., filtering or rollup level changes). The appropriate next action model can be selected based on a trigger event for the type of action. For example, the application 154 may use a scope change model to predict which range of date and time a user will likely select in response to the user selecting a date and time range selector user interface element. In some implementations, the application 154 may use multiple next action models to determine multiple predicted next actions and obtain and store data for each of the multiple predicted next actions in the high speed cache 156 before the user performs the actions. For example, the application 154 may use a place change next action model to determine a predicted next place change action and a scope change next action model to determine a predicted next scope change action. The application 154 can then obtain and store the data for both predicted next actions in the high speed cache 156.

The data distribution system 110 includes a front-end server 112 that receives requests for data and provides the data in response to the requests. For example, the front-end server 112 may receive requests for data from the applications 154 of the client devices 150. The requests can include requests for next action data based on predicted next actions determined using the next action model(s) 158.

The front-end server 112 can provide the requests to a data management server 116. The data management server 116 can obtain the appropriate data from an application data storage device 124 (e.g., hard drive(s), flash memory, etc.) and provide the data to the front-end server 112. In turn, the front-end server 112 can transmit the data to the client device 150 from which the request was received over the data communication network 130.

The data management server 116 can manage the data for applications, such as the applications 154 of the client devices 150. The data management server 116 may receive the data from application developers, from servers that aggregate data that is displayed by the applications, or other sources and stores the data in the application data storage device 124.

The data distribution system 110 also includes a next action prediction server 114. The next action prediction server 114 can generate next action models 158, update next action models 158, monitor the performance of next action models 158, and/or determine predicted next actions for applications 154.

The next action prediction server 114 can generate next action models based on action data stored in an action data storage device 120. The action data can specify, for particular user interfaces 152 of the applications 154, actions that were performed at the user interfaces 152. The action data can also specify the context of the user interfaces 152 when the actions occurred. For example, the action data can include, for each action (of a set of potential actions) performed at a user interface 152 of an application 154, data identifying the user interface that was presented when the action was performed and one or more attributes of the user interface when the action was performed. As described above, the attributes can include the type of data that is being presented a group to which the data belongs, characteristics of the data, a rollup level of the data, a tab of the application that is currently presented, a status of the user interface, and/or other appropriate attributes of the user interface or data being presented by the user interface. The action data can also include, for each action performed at a user interface 152 of an application, a time at which the action was performed and/or a unique anonymous identifier for a user that performed the action.

The applications 154 can be configured to send action data to the front-end server 112 in response to detecting actions performed at user interfaces 152 of the applications 154. For example, if a user uses a filtering element of a user interface 152 of an application to filter a particular set of data to a particular date and time range, the application 154 can perform the filtering for the user and present the filtered data in the user interface 152. The application 154 can also send to the front-end server 112 action data specifying, for example, the date and time range, attributes of the particular set of data (e.g., the group to which the data belongs, type of data, account to which the data belongs, etc.), attributes of the user interface 152 at which the action was performed, the time at which the action was performed, and a unique identifier for the user or user device 150. The front-end server 112 can send the action data to the next action prediction server 114 and the next action prediction server 114 can store the action data in the action data storage device 120. The applications 154 can send the action data for each action after the action is performed and/or periodically.

The next action prediction server 114 can generate one or more next action models 158 for an application 154 and store the next application model(s) in next action models data storage device 118. The application 154 can also include its next action models 158 so that the application 154 can determine predicted next actions at the client devices 150. As described in more detail below, the next action prediction server 114 may use the next action models 158 to determine the predicted next actions for the application 154.

The next action prediction server 114 can generate the next action model(s) 158 for an application 154 based on the action data for the application 154 stored in the action data storage device 120. As described above, a next action model 158 can specify probabilities of an action being performed based on the user interface context of a user interface. In this example, the next action prediction server 114 can determine the probabilities for the actions based on the number of times each action occurred for each user interface context. For example, if a particular action occurred ten times when the user interface for the application 154 has a particular user interface context and a total of one hundred actions were performed at the user interface when the user interface had the particular user interface context, the probability of the particular action may be 10% (10/100).

In some implementations, more recent actions are given a higher weight when determining the probabilities for the actions. For example, the weight of an action may decay over time. In this way, more recent actions that are more popular (e.g., that have occurred more often within a particular period of time) can have a higher probability which may result in the action being the predicted next action. In some implementations, the probability for a particular action is updated based on data for a new action being received using the following relationships:

$$\rho = (1-\alpha)\rho + \alpha \qquad \text{Relationship (1)}$$

$$\rho = (1-\alpha)\rho \qquad \text{Relationship (2)}$$

If this example, ($\rho$) is the probability of the particular action being performed and ($\alpha$) is the degree of weight decrease. In this example, the probability of the particular action occurring is updated using Relationship (1) if the particular action was performed. If the particular action was not performed, the probability is updated using Relationship (2). The use of these relationships results in the nth most recent action will have a weight of $(1-\alpha)^n$.

As described above, an application 154 can have user-specific next actions models 158 and general next action models for multiple users. A user-specific next action model for a particular user may be generated and updated using action data for the particular user. General next action models may be generated and updated using action data for multiple different users.

In some implementations, the next action prediction server 114 updates the next action model 158 whenever new action data that affects the next action model 158 is received. The next action prediction server 114 can then send the updated next action model 158 to the applications 154 at the client devices 150.

In some implementations, the next action prediction server 114 generates next action models 158 for different types of actions. For example, as described above, an application 154 can have separate next action models for different types of actions. In this example, the next action prediction server 114 can generate the next action model for a particular type of action using the action data for those types of actions. For example, the next action prediction server 114 may determine the probabilities for a particular action of a particular type based on the number of times the particular action has been performed when the user interface had a particular context and the total number of actions of the particular type that have been performed when the user interface had the particular context.

The next action prediction server 114 can also train predictive models using machine learning techniques using the action data stored in the action data storage device 120. For example, the next action prediction server 114 may generate Markov chains to predict next user actions based on a current user interface context. A Markov chain is a model that uses a sequence of possible actions in which the probability of each action depends on the state (e.g., context) of the current user interface.

In some implementations, the next action prediction server 114 uses the next action models 158 to determine predicted next actions for a user of an application. For example, an application 154 may determine the user interface context (e.g., identify the one or more attributes of the user interface 152) and send a request for next action data to the front-end server 112. The request can include the one or more attributes of the user interface context. The next action prediction server 114 can identify an appropriate next action model 158 from the next action model data storage device 118 and use the next action model 158 to determine one or more predicted next actions based on the user interface context. For example, the next action prediction server 114 can identify the next action model 158 for the application 154. If the application 154 has user-specific next action models, the next action prediction server 114 can identify the next action model for the application and for the user of the client device 150 from which the request was received.

The next action prediction server 114 can provide data specifying the predicted next action(s) to the data management server 116. The data management server 116 can identify the data that will be presented at the client device 150 if the user performs the predicted next action(s) and provide the data to the front-end server 112. In turn, the front-end server 112 can provide the data to the client device 150 and the client device 150 can store the data in the high speed cache 156.

The next action prediction server 114 can also maintain performance metrics for the next action models and store the performance metrics in a performance data storage device 122. The metrics for a next action model can include a prediction accuracy for the next action model, a cache hit rate for the next action model, and/or a user action latency for the next action model. The prediction accuracy for a next action model can be based on a ratio between the number of times the next action model predicted the action that the user subsequently performed and the total number of predictions made by the next action model. The cache hit rate for a next action model can be based on a ratio between the number of times the data required to respond to a user action for which the next action model was used to determine a predicted next action is found in the high speed cache 158 and a total number of times data is requested in response to a user action for which the next action model was used to determine a predicted next action. The user action latency can indicate a latency of an action as perceived by a user. For example, the user action latency can indicate the latency from a time at which the user performs an action (e.g., selects a tab or submits filtering criteria) to a time at which the new or uprated data is rendered at the client device 150. This time and can be measured and aggregated (e.g., averaged) for multiple uses of a next action model to determine an aggregate user action latency for the next action model.

FIG. 2 depicts an example user interface 200 in which data is presented. The example user interface 200 is depicted as being presented in a web browser. The user interface 200 can also be presented in a mobile application.

The user interface 200 includes a group menu 210 that enables a user to select a group of data for presentation, e.g., a particular campaign or account. For example, the user can select a group by clicking on the group using a mouse or by touching a touch screen device at the location of the group. The selection of a group can be a next action that is predicted by a next action model for an application that generates and presents the user interface 200. In addition, the group for which data is presented can be an attribute that defines the user interface context for the user interface 200. For example, users that view data for group 2 may commonly view data of a particular type. In this example, when data for group 2 is being presented, the next action model may be used to determine that the predicted next action is the selection of data of the particular type and the application may pre-cache the data of the particular type for group 2.

The user interface 200 also includes a data type menu 215 that enables a user to select the type of data for the group to be presented. The data of the selected data type and for the selected group is presented in a display area 205. As mentioned above, the selection of a data type may be a next action that is predicted using a next action model. The type of data that is presented can also be an attribute that defines the user interface context for the user interface 200.

The user interface 200 also include a date and time range selector 220 that allows a user to select a date and time range for the data that is presented in the display area 205. In this example, the selected date and time range is Nov. 1, 2016-Nov. 30, 2016. The data presented in the display area 205 may be filtered so that only data related to the selected date and time range is presented. The user interface 200 can include other filtering elements such as those for filtering based on values of the data or other filtering criteria.

The selection of a particular (or relative) date and time range may be a next action that is determined by a next action model. For example, users may often view the previous month's data when viewing data of a particular type. In this example, the particular type of data is an attribute of the user interface context that allows the next action model to predict that the next action will be a selection of the previous month for the data. In response, the application can pre-cache the previous month's data of the particular data type, e.g., for the selected group. In addition, the selection of the date and time range selector 220 may be a trigger event that causes the application to determine a predicted next action. For example, the application may access the next action model and use the next action model to determine which next action has the highest probability given the group and data type for the data being presented at the time that the date and time range selector 220 was selected. In this way, the data can be pre-cached while the user is specifying a desired date and time range using the date and time range selector 220.

Another trigger event may be a custom date and time entered by the user. For example, the user interface element may allow a user to specify a custom data and time and select some button to filter the data based on the custom date and time. In this example, the application can determine that the predicted next action will be the user selecting the button to filter the data. In response, the application can send a request for the data for the entered data and time before the user selects the button.

The user interface 200 also includes a rollup level selector 225 that enables a user to select a time-based rollup level for the data presented in the display area 205. For example, the rollup level selector 225 may allow for daily data, monthly data, or yearly data to be presented in the display area 205. The selection of a particular rollup level may be a predicted next action determined using a next action model. For example, users may typically view daily data when the date and time range is for at least one month but less than three months. In this example, the selected date and time range is an attribute of the user interface context that allows the next action model to be used to determine that the predicted action that the user will likely perform is a selection of a daily rollup level.

An application may use a next action model to determine a predicted next action based on one or more of the selected group, the selected data type, the selected date and time range, and the selected rollup level. As the user makes different selections at the user interface, the application can use the updated user interfaced context and the next action model to determine subsequent predicted next actions and pre-cache the data that will presented in the user interface 200 if the user performs the predicted next actions prior to the user performing the predicted next actions.

Figure 3:
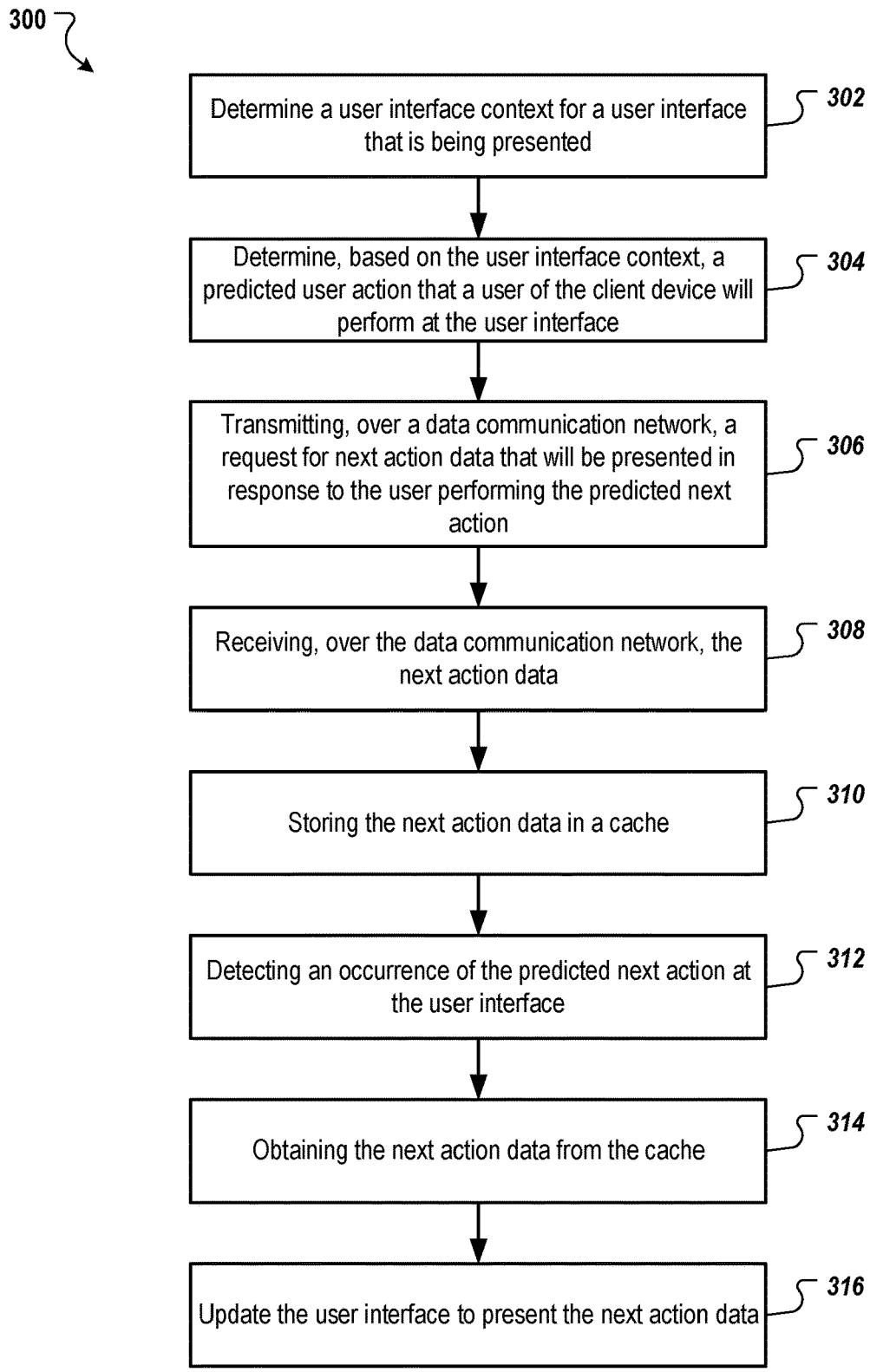
FIG. 3 is a flow chart of an example process for determining a predicted next action and pre-caching next action data for the predicted next action.

FIG. 3 is a flow chart of an example process 300 for determining a predicted next action and pre-caching next action data for the predicted next action. Operations of the process 300 can be implemented, for example, by a system that includes one or more data processing apparatus, such as the client device 150 of FIG. 1. The process 300 can also be implemented by instructions stored on computer storage medium, where execution of the instructions by a system that includes a data processing apparatus cause the data processing apparatus to perform the operations of the process 300.

The system determines a user interface context for a user interface that is being presented (302). For example, the user interface may be generated and presented by an application (e.g., a web application or mobile application). The user interface context may be defined by one or more attributes of the user interface, such as the type of data that is being presented, a group to which the data belongs, characteristics of the data, a rollup level of the data, a tab of the application that is currently presented, a status of the user interface, and/or other appropriate attributes of the user interface or data being presented by the user interface.

The system determines a predicted user action based on the user interface context (304). The predicted user action may be an action that a user of the application is likely to perform at the user interface based on the user interface context. For example, the predicted user action may be an action having at least a threshold probability of being performed by the user. In another example, the predicted user action may be a user action having a highest probability among multiple possible user actions that can be performed at the user interface.

In some implementations, the system uses a next action model to determine the predicted next action. For example, the next action model may specify, for each action of a set of actions, the probability of the action being performed based on a user interface context. In a particular example, the next action model may specify that a user action of navigating to a particular tab has a probability of 10% when the user interface has a context that includes the presentation of a second tab different from the particular tab and that includes a particular group of data. The next action model may also specify that the user action of navigating to the particular tab has a probability of 20% when the user interface has a context that includes the presentation of a third tab that includes a different group of data.

In some implementations, the system may select multiple predicted next actions for which to pre-cache data. For example, multiple predicted next actions may have at least a threshold probability of being performed by the user. In another example, the system may select a specified number of the actions that have the highest probabilities. In this way, the system is more likely to obtain and pre-cache the data for the user before the user performs the action.

The system transmits, over a data communication network, a request for next action data that will be presented in response to the user performing the predicted next action (306). The system may transmit the request to a data distribution system, such as the data distribution system 110 of FIG. 1. For example, the system may send a request that specifies the data that system would request if the user had actually performed the predicted next action. In another example, the system may send a request that specifies the action rather than, or in addition to, the data that will be presented in response to the user performing the predicted next action. In this example, the data distribution system 110 can identify the appropriate data based on the predicted next action.

The system receives, over the data communication network, the next action data (308). For example, the system may receive the data from the data distribution system 110 of FIG. 1.

The system stores the next action data in a cache of the system (310). For example, the system may include a high speed cache or other memory storage local to the system in which the system stores the next action data. By storing the next action data in local memory, the next action data can be presented more quickly if the user actually performs the predicted next action as the system would not have to wait for the request to traverse the network and the next action data to arrive.

The system detects an occurrence of the predicted next action at the user interface (312). For example, the user interface may be presented by an application that is being executed by the system. The application can monitor for user interactions with the user interface and perform actions, e.g., update data, navigate to a different tab, etc., in response to detecting the user interactions.

The system obtains the next action data from the cache in response to detecting the occurrence of the predicted next action (314). For example, the system may obtain the next action data from the cache of the system without sending another request over the network.

The system updates the user interface to present the next action data (316). For example, if the predicted next action is to navigate to a different tab and the user selected the different tab, the system may navigate the user interface to the different tab and present the next action data in the different tab. In another example, if the predicted next action is to filter data to a particular date and time range, the system may present the filtered data in the user interface.

Figure 4:
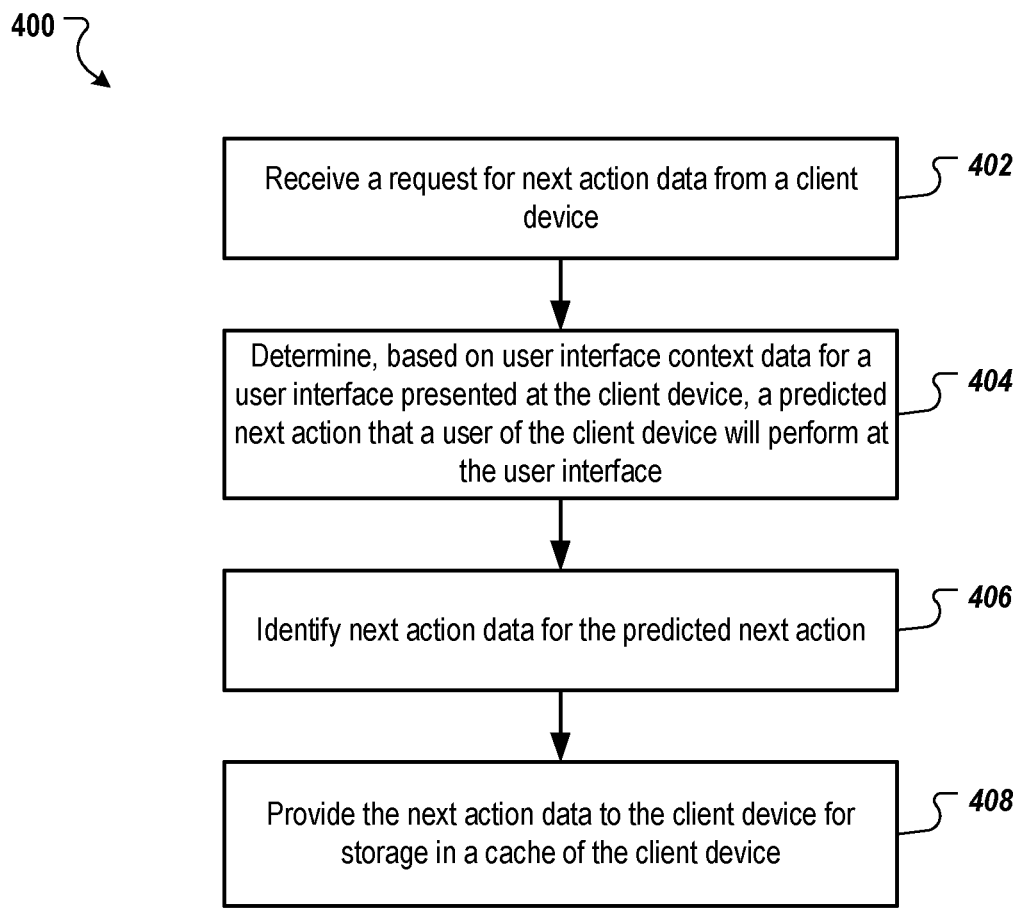
FIG. 4 is a flow chart of example process for determining a predicted next action and pre-caching next action data for the predicted next action.

FIG. 4 is a flow chart of example process 400 for determining a predicted next action and pre-caching next action data for the predicted next action. Operations of the process 400 can be implemented, for example, by a system that includes one or more data processing apparatus, such as the data distribution system 110 of FIG. 1. The process 400 can also be implemented by instructions stored on computer storage medium, where execution of the instructions by a system that includes a data processing apparatus cause the data processing apparatus to perform the operations of the process 400.

The system receives a request for next action data from a client device (402). For example, the system may receive the request from a client device that is presenting a user interface generated by an application executing on the client device. The client device may transmit the request to the system over a data communication network, e.g., in response to detecting a trigger event. The trigger event may include selecting a filter user interface element (e.g., a date and time range selector), a rollup level user interface element, an address bar, hovering a pointer (e.g., a cursor) over data, or another appropriate event.

In another example, the client device may transmit the request without detecting a trigger event. For example, the client device may transmit a request each time the user interface is updated. In this example, the client device can attempt to stay one step ahead of the user by determining a predicted next action for each user interface the user views.

The request can include user interface context data defining the user interface context. For example, the request can include data specifying one or more attributes of the user interface that is being presented to the user.

The system determines, based on the user interface context data, a predicted next action that a user of the client device will perform at the user interface (404). For example, as described above, the system can use a next action model to determine one or more predicted next actions for the user based on the user interface context data.

The system identifies next action data for the predicted next action (406). The next action data for the predicted next action includes data that will be presented by the client device if the user actually performs the predicted next action.

The system provides the next action data to the client device for storage in a cache of the client device (408). The client device can store the next action data in the cache. If the client device detects that the predicted next action was performed, the client device can obtain the data from the cache and present the data to the user.

Figure 5:
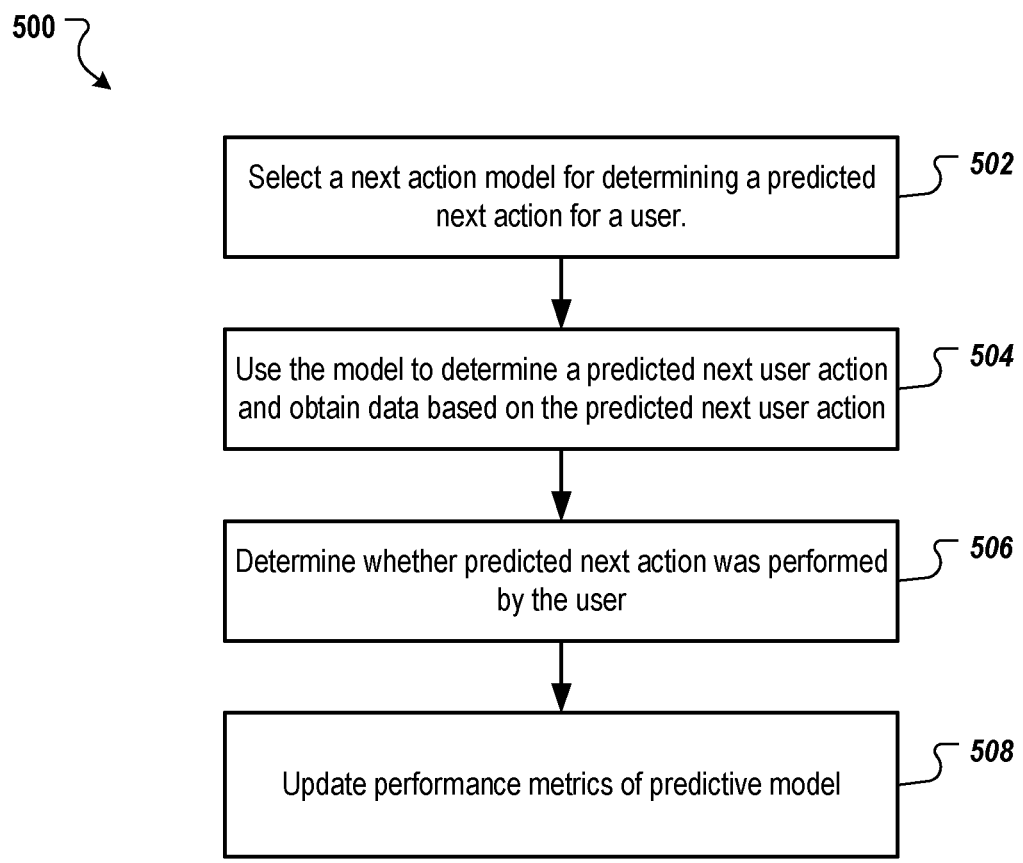
FIG. 5 is a flow chart of an example process for maintaining performance metrics for predictive models that are used to determine predicted next actions.

FIG. 5 is a flow chart of an example process 500 for maintaining performance metrics for predictive models that are used to determine predicted next actions. Operations of the process 500 can be implemented, for example, by a system that includes one or more data processing apparatus, such as the data distribution system 110 of FIG. 1. The process 500 can also be implemented by instructions stored on computer storage medium, where execution of the instructions by a system that includes a data processing apparatus cause the data processing apparatus to perform the operations of the process 500.

The system selects a predicted model for determining a predicted next action for a user (502). In some implementations, the system selects the next action model based on a number of actions performed by a user at user interfaces generated and presented by an application. For example, if the user has performed less than a threshold number of actions, the system may select a general next action model generated based on actions performed by multiple users as the system may not have enough data for the user to generate a user-specific next action model for the application.

In some implementations, the system selects the next action model based on one or more performance metrics for the next action models. For example, the system may select the next action model having the highest prediction accuracy, the highest cache hit rate, and/or the lowest user action latency.

The system uses the selected next action model to determine a predicted next user action and obtain data based on the predicted next user action (504). For example, the system may obtain data for the predicted next action from a server and store the data in a cache of a client device.

The system determines whether the predicted next action was performed by the user (506). For example, the system may receive data from a client device at which the user interface is being presented indicating whether the next user action was performed. The system may also receive data indicating whether the data for the action the user performed was found in the client device's cache and/or data indicating a latency in presenting data in response to the user's performed action.

The system updates the performance metric(s) for the selected next action model (508). For example, the system may update the performance accuracy, cache hit rate, and/or user action latency for the next action model based on the received data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A client device, comprising:
    a display that presents user interfaces for one or more mobile applications;
    a data storage device having a cache that stores data received over a data communication network for the one or more mobile applications;
    a data processing apparatus that communicates with the data storage device and the display, and performs operations comprising:
        determining a user interface context for a given user interface being presented by the display for a given application, the user interface context for the given user interface specifying at least one of (i) a group to which data that is being presented in the given user interface belongs or (ii) a type of data that is being presented in the given user interface;
        determining, based on the user interface context, a predicted next action that a user of the client device will perform at the given user interface;
        transmitting, over the data communication network and prior to detecting the predicted next action, a request for next action data that will be presented in response to the user performing the predicted next action;
        receiving, over the data communication network, the next action data;
        storing the next action data in the cache;
        determining that the next action data will be presented by a second application different from the given application;
        prior to detecting the predicted next action, obtaining code for executing the second application; and
        storing the code in the cache.

2. The client device of claim 1, wherein the operations further comprise:
    detecting an occurrence of the predicted action at the given user interface;
    obtaining the next action data from the cache; and
    updating the user interface to present the next action data.

3. The client device of claim 1, wherein the user interface context specifies a rollup level of the data that is being presented in the given user interface, the rollup level specifying a hierarchical level at which the data is aggregated.

4. The client device of claim 1, wherein the predicted action next action is determined based on a number of times each action of a set of possible actions that can be performed at the given user interface has been performed by one or more users including the user when the given user interface had a context that matches the determined user interface context.

5. The client device of claim 1, wherein the operations further comprise detecting a trigger event for determining the predicted next action, wherein the predicted next action is determined in response to detecting the trigger event.

6. The client device of claim 1, wherein the operations further comprise:
    obtaining a prediction model that determines the predicted next action based on the user interface context; and
    converting the predictive model to mappings between predicted next actions and probabilities, each mapping being a mapping between a respective predicted next action and a probability of the respective predicted next action occurring for a given user interface context.

7. The client device of claim 6, wherein the operations further comprise selecting the predictive model from a set of predictive models based on at least one of (i) a prediction accuracy for each predictive model, (ii) a cache hit rate for each predictive model, (iii) a reduction in latency provided by each predictive model, or (iv) a number of historical user interactions performed by the user at the given user interface.

8. A system, comprising:
    one or more data storage devices that store data for one or more applications;
    one or more front-end servers that receive requests for next action data and provide the next action data in response to the requests; and
    one or more back-end servers that communicate with the one or more front-end servers and the one or more data storage devices, the one or more back-end servers performing operations comprising:
        receiving, from the one or more front-end servers, a given request for next action data that was received from a given client device, the request including user interface context data specifying at least one of (i) a group to which data that is being presented in a given user interface for a given application of the given client device belongs or (ii) a type of data that is being presented in the given user interface;
        determining, based on the user interface context data, a predicted next action that a user of the given client device will perform at the given user interface;
        identifying, in the one or more data storage devices, next action data for the predicted next action;
        providing the identified next action data to the one or more front-end servers for transmission to the given client device, wherein the given client device stores the identified next action data in a cache of the given client device;
        determining that the next action data will be presented by a second application different from the given application; and
        prior to detecting the predicted next action, sending, to the given client device, code for executing the second application, wherein the given client device stores the code in the cache.

9. The system of claim 8, wherein the given client device performs operations comprising:
- detecting an occurrence of the predicted action at the given user interface;
- obtaining the next action data from the cache; and
- updating the given user interface to present the next action data.

10. The system of claim 8, wherein the user interface context data specifies a rollup level of the data that is being presented in the given user interface, the rollup level specifying a hierarchical level at which the data is aggregated.

11. The system of claim 8, wherein the predicted action next action is determined based on a number of times each action of a set of possible actions that can be performed at the given user interface has been performed by one or more users including the user when the given user interface had a context that matches the determined user interface context.

12. The system of claim 8, wherein the operations further comprise detecting a trigger event for determining the predicted next action, wherein the predicted next action is determined in response to detecting the trigger event.

13. The system of claim 8, wherein the operations further comprise:
- obtaining a prediction model that determines the predicted next action based on the user interface context; and
- converting the predictive model to mappings between predicted next actions and probabilities, each mapping being a mapping between a respective predicted next action and a probability of the respective predicted next action occurring for a given user interface context.

14. The system of claim 13, wherein the operations further comprise selecting the predictive model from a set of predictive models based on at least one of (i) a prediction accuracy for each predictive model, (ii) a cache hit rate for each predictive model, (iii) a reduction in latency provided by each predictive model, or (iv) a number of historical user interactions performed by the user at the given user interface.

15. A method, comprising:
- determining a user interface context for a given user interface being presented by a display of a client device for a given application, the user interface context for the given user interface specifying at least one of (i) a group to which data that is being presented in the given user interface belongs or (ii) a type of data that is being presented in the given user interface;
- determining, based on the user interface context, a predicted next action that a user of the client device will perform at the given user interface;
- transmitting, over the data communication network and prior to detecting the predicted next action, a request for next action data that will be presented in response to the user performing the predicted next action;
- receiving, over the data communication network, the next action data; and
- storing the next action data in the cache;
- determining that the next action data will be presented by a second application different from the given application;
- prior to detecting the predicted next action, obtaining code for executing the second application; and
- storing the code in the cache.

16. The method of claim 15, further comprising:
- detecting an occurrence of the predicted action at the given user interface;
- obtaining the next action data from the cache; and
- updating the user interface to present the next action data.

17. The method of claim 15, wherein the user interface context specifies a rollup level of the data that is being presented in the given user interface, the rollup level specifying a hierarchical level at which the data is aggregated.

18. The method of claim 15, wherein the predicted action next action is determined based on a number of times each action of a set of possible actions that can be performed at the given user interface has been performed by one or more users including the user when the given user interface had a context that matches the determined user interface context.

* * * * *

UNITED STATES PATENT AND TRADEMARK OFFICE
CERTIFICATE OF CORRECTION

| | |
|---|---|
| PATENT NO. | : 10,356,200 B2 |
| APPLICATION NO. | : 15/392894 |
| DATED | : July 16, 2019 |
| INVENTOR(S) | : Zhang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Twenty-eighth Day of January, 2020

Andrei Iancu
*Director of the United States Patent and Trademark Office*